United States Patent

[11] 3,599,212

[72] Inventors John E. Bickel
San Diego;
Clemens H. Freres, San Diego; Earl E. Gossard, Del Mar; James E. Britt, San Diego; Norman R. Ortwein, San Diego; Eric R. Swanson, San Diego, all of, Calif.
[21] Appl. No 823,238
[22] Filed Apr. 29, 1969
[45] Patented Aug. 10, 1971
[73] Assignee The United States of America as represented by the Secretary of the Navy

[54] VERY LOW FREQUENCY TACTICAL COMMAND SYSTEM
3 Claims, 3 Drawing Figs.
[52] U.S. Cl. .................................................. 343/105 R, 343/112

[51] Int. Cl. ..................................................... G01s 1/32
[50] Field of Search ........................................ 343/105, 112

[56] References Cited
UNITED STATES PATENTS
3,400,399 9/1968 Kline ........................... 343/105 X Primary Examiner—Richard A. Farley
Assistant Examiner—Richard E. Berger
Attorneys—G. J. Rubens, J. W. McLaren, R. S. Sciascia and Thomas M. Phillips ABSTRACT: To display at a command post the positions of all vehicles in a tactical area, each vehicle receives three VLF's of an "Omega" grid of hyperbolic lines and retransmits the phase information thereof via an HF link to the command post.

PATENTED AUG 10 1971 3,599,212

INVENTORS
JOHN E. BICKEL
CLEMENS H. FRERES
EARL E. GOSSARD
JAMES E. BRITT
NORMAN R. ORTWEIN
ERIC R. SWANSON

BY *T. L. Stymen*
ATTORNEYS

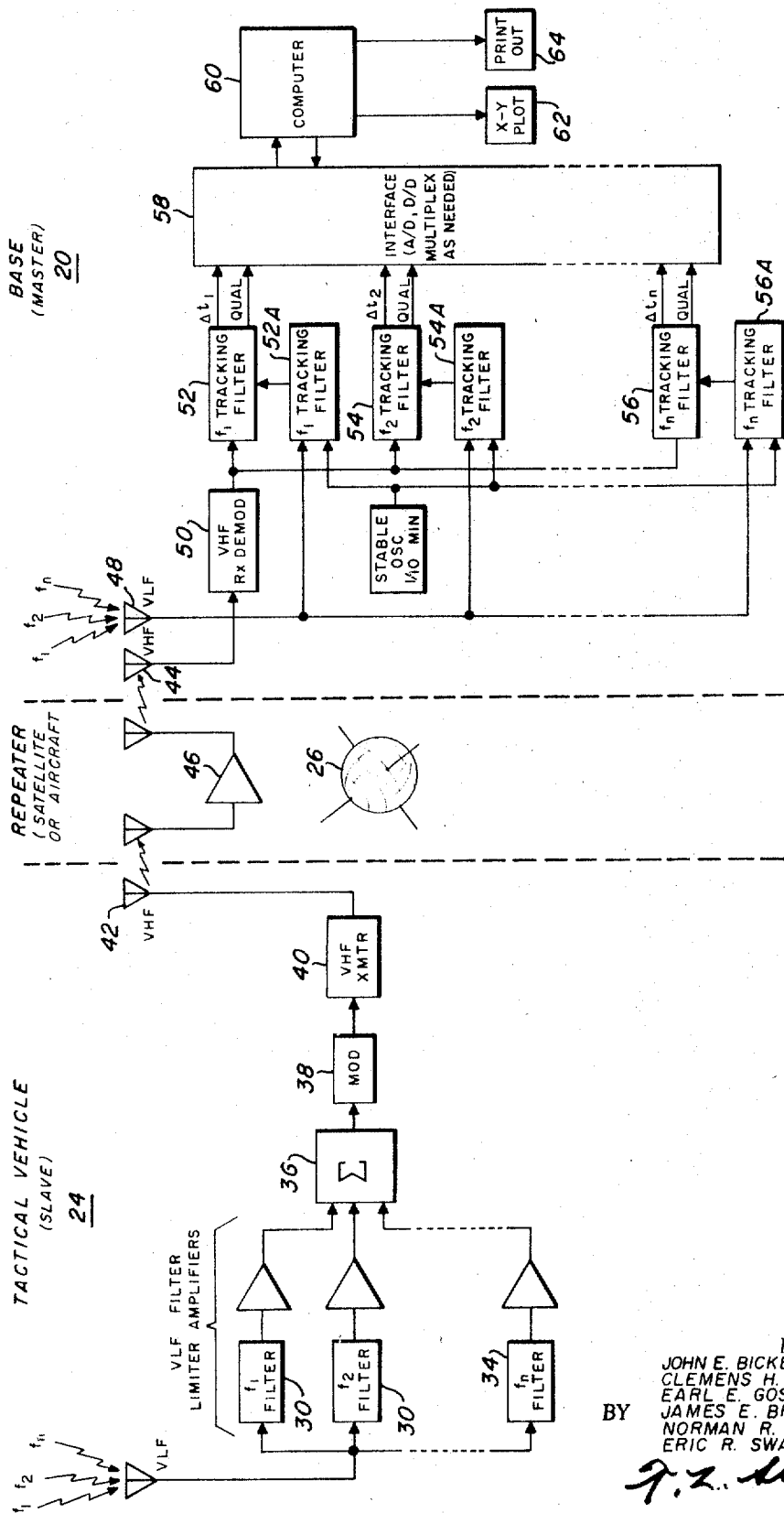

VERY LOW FREQUENCY TACTICAL COMMAND SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Radio navigating systems are generally of little value in controlling traffic in a tactical area and do not respond well to a central command. Jet fighters are fast and can be over the radio horizon much of the time. Homing systems can guide fighters to their carriers, but little more. All navigating equipment which must be airborne is prohibitively expensive in terms of reduces payloads. This fact is particularly true of the longwave radio gear used in the Omega System where land-based transmitters of a very low frequency (VLF) lay down a grid of hyperbolic lines. Antennas for very low frequencies are long and all the gear is massive compared to corresponding high frequency equipment.

The object of this invention is to minimize the weight of radio gear to be carried in the moving units in a tactical or battle area and at the same time provide the area commander with a display of the position of all the friendly units in his command.

SUMMARY OF THE INVENTION

The objects of this invention are obtained by a repeater for receiving the very low frequency position information signals, modulating the information on a high frequency carrier and retransmitting the modulated carrier to the master or headquarters station where the phase information is detached and displayed. This provides the headquarters command with a picture of all units in the area and at the same time relieves the airborne unit of the bulkiness and weight of phase detectors and computing equipment for position determination.

DESCRIPTION OF THE DRAWINGS

FIG. 3 is a block diagram of the equipment of this invention.

PREFERRED EMBODIMENTS OF THE INVENTION

Figure 1:
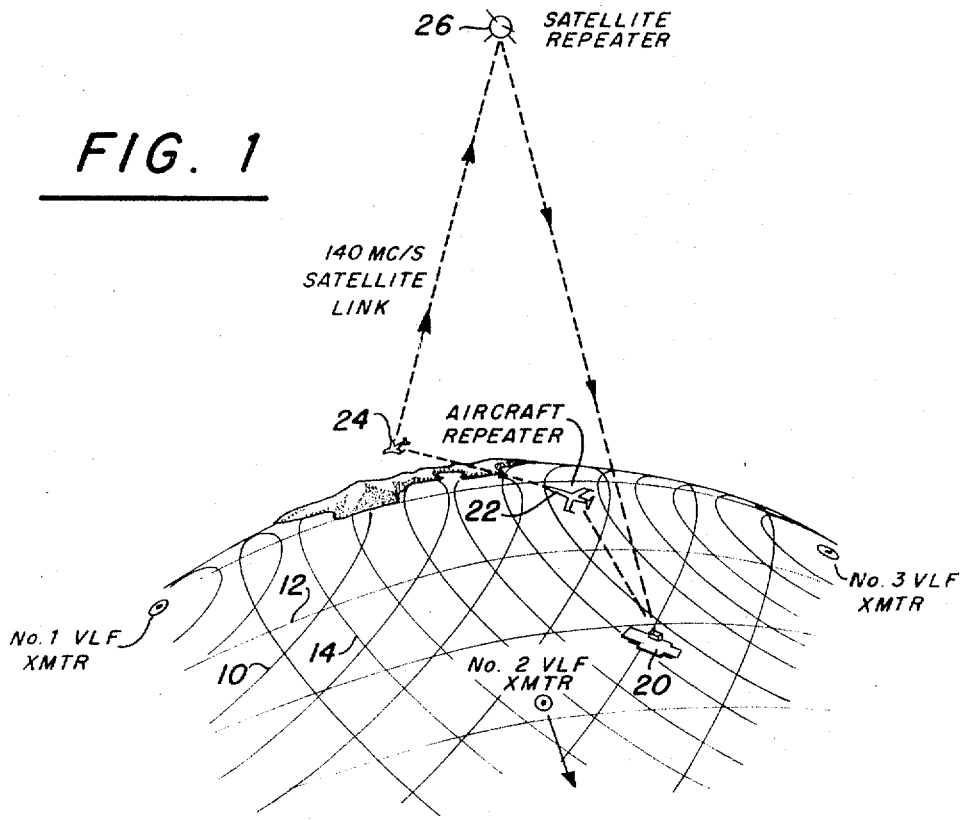
FIG. 1 is a perspective view of a segment of the earth's surface and the deployment of equipment of the system of this invention.

A substantial portion of the earth's surface is presently covered by an "Omega" grid where very low frequency transmitters are located on landmasses at various points about the globe. Each transmitter is connected to a long dipole antenna. The low frequencies follow the curvature of the earth and are not substantially attenuated over the horizon as in the case of higher frequencies. In FIG. 1 is shown the isophase lines 10, 12, and 14, each of which is a loci of points that are of a uniform difference in distance from two of the low frequency transmitters 1, 2, and 3. Thus, each line is hyperbolic. Surface ships now successfully employ this grid for oceanwide navigation. Shipboard gear receives all signals; tunes in the three relevant signals, and determines the phase difference between the waves from each of the three pairs of transmitters 1, 2, and 3, to identify the three isophase lines 10, 12, and 14, thus quite accurately locating the ship's position with respect to the transmitters 1, 2, and 3.

Figure 2:
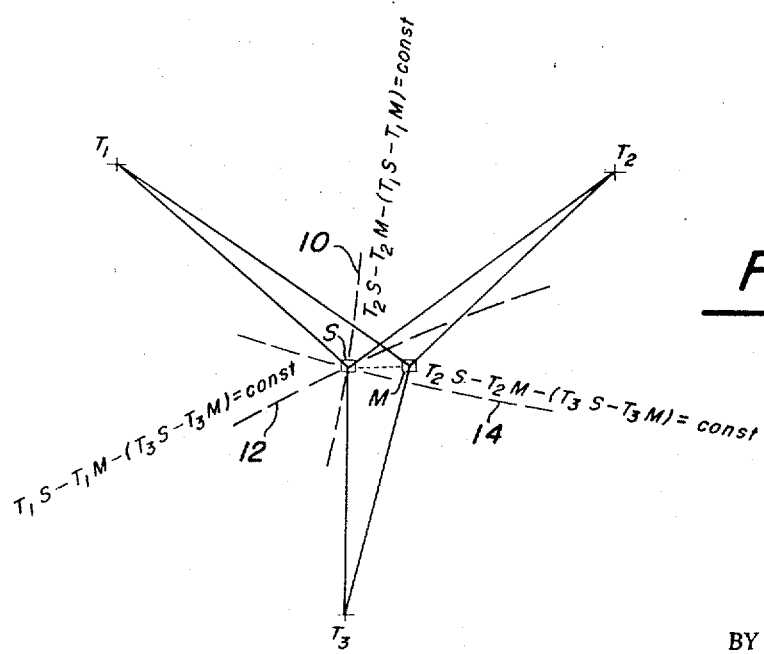
FIG. 2 is a diagram showing the geometric problem solved by the system of this invention.

In a tactical area, there may be involved the carrier 20, the large aircraft 22, such as a bomber or a command plane, and a number of fighter planes 24, which are light in weight, and very fast. If the airborne units move over the horizon beyond radio range of the surface command craft, the satellite 26 may be employed to reestablish a telemetry link. The problem in geometry for establishing the position of the aircraft unit 24, with respect to its home station, which will be assumed to be the carrier 20, is shown in FIG. 2.

In this system pulses from each of the three fixed stations $T_1$, $T_2$, and $T_3$ are simultaneously transmitted onmidirectionally and are received at different times at all the receivers, depending upon the ranges involved. Instead of burdening the light, high speed craft with the weight of the equipment necessary for detecting and solving these three phase and distance problems, the three signals are, according to this invention, transmitted via telemetry links without modification to the headquarters station. The headquarters at 20 may be termed the "master" station M, while the light craft with their relays may be termed the "slave" stations, S. At the master station, three simultaneous equations defining the three hyperbolic isophase lines 10, 12, and 14 intersecting slave station "S" in FIG. 2, are solved to determine the location of S. The position solution of each slave is displayed locally on the screen of a cathode ray tube and may or may not be relayed by a voice radio back to the pilot at the slave station.

A block diagram of one position determining system of this invention is shown in FIG. 3. The tactical vehicle 24, or slave, carries only repeater equipment phase information. Each repeater includes filters 30, 32, and 34 for receiving selectively the very low frequency signals $f_1$, $f_2$, $f_3$ from three transmitters of the Omega System. After amplification and limiting, the three signals are combined without second order effects or distortion in the summer 36 and applied to modulator 38 for modulating the high frequency carrier generated in the VHF transmitter 40 and are radiated preferably omnidirectionally by antenna 42.

If the master and slave stations are within radio range, the master antenna 44 can receive the modulated signal directly from the moving slave antenna 42. If, however, this range is exceeded, an intermediate repeater 46 must be used. The repeater may comprise the repeating amplifier on a local high altitude drone plane, or in an orbiting satellite 26.

Since more than one slave repeater is to be received, distinction at the master can be made by frequency discrimination or by clock-controlled time multiplexing.

At the master station, the same low frequency "Omega" signals received by the slave stations are received on the master antenna 48. The repeated information of the high frequency telemetry link is demodulated at 50 and is applied to the three filters 52, 54 and 56 which are in all important respects the same as filters 30, 32, and 34. Hence, the output of demodulator 50 contains all the information necessary to locate the position of the slave station 24 with respect to $T_1$, $T_2$, and $T_3$. Now, information concerning the location of the master station with respect to the same three "Omega" transmitters is received on antenna 48 and is applied directly to the three tracking filters 52A, 54A and 56A. If the information at the output of the six filters is analog in nature, it is preferred that the information be converted to digital words readable by the computer 60. Before or after analog-to-digital conversion in interface equipment 58, the information is divided into appropriate time segments when multiplexing is used and is fed into the computer 60. Many general purpose computers, as well known, are quite capable of instantly solving the three simultaneous equations of FIG. 2 for locating slave S, and of solving similar equations for locating master M, and hence determining the direction and length of the M—S line. Position information concerning each tactical unit 24 may be continuously or intermittently read out to the display 62. Exact position information can be printed out as desired at 64. Conveniently, by voice radio, central command can control each tactical unit singly or collectively.

It will be perceived that the accuracy of position control is limited only by the relatively short master-to-slave range. Any errors in the long ranges from M and S to the fixed "Omega" transmitters, are substantially equal and can be ignored.

Obviously many modifications and variations of the present invention are possible in the light of the above teachings. It is

What we claim is:

1. In combination in a system for location and tracking vehicles in a tactical area;
    a plurality of stationary tramsmitters spaced about the earth's surface for generating a grid of "Omega" very low frequency isophase lines,
    a plurality of slave stations each consisting of a vehicle in the receiving range of said transmitters, each vehicle carrying a repeater, each repeater comprising a radio transmitter for transmitting a frequency relatively higher than the frequencies of said stationary transmitters and means for receiving the said low frequencies and modulating the high frequency with the phase information of the low frequencies,
    a master station consisting of a first receiver for receiving and demodulating the position information modulated on said high frequencies from each slave repeater and a second receiver for receiving directly and demodulating the master station position information with respect to said fixed transmitters, and
    a computer coupled to the outputs of said receivers for determining the position of each slave station with respect to said master station.

2. The system defined in claim 1 further comprising;
    display means for displaying the relative positions of each of said slave station with respect to each other and with respect to said master station.

3. The system defined in claim 1 further comprising;
    a relay station within radio range of said master and slave stations for relaying said modulated high frequencies when the master station is over the radio horizon from the slave stations.